(12) United States Patent
Kwok et al.

(10) Patent No.: US 8,687,700 B1
(45) Date of Patent: Apr. 1, 2014

(54) METHOD AND/OR APPARATUS FOR OBJECT DETECTION UTILIZING CACHED AND COMPRESSED CLASSIFIER INFORMATION

(75) Inventors: Wilson Kwok, Santa Clara, CA (US); Leslie D. Kohn, Saratoga, CA (US)

(73) Assignee: Ambarella, Inc., Santa Clara, CA (US)

( * ) Notice: Subject to any disclaimer, the term of this patent is extended or adjusted under 35 U.S.C. 154(b) by 804 days.

(21) Appl. No.: 12/818,396

(22) Filed: Jun. 18, 2010

(51) Int. Cl.
*H04N 7/12* (2006.01)
*H04N 11/02* (2006.01)
*H04N 11/04* (2006.01)

(52) U.S. Cl.
USPC .................................. 375/240.23

(58) Field of Classification Search
USPC ................ 382/159; 375/240.08, 240.23
See application file for complete search history.

(56) References Cited

U.S. PATENT DOCUMENTS

| | | | |
|---|---|---|---|
| 6,574,279 B1* | 6/2003 | Vetro et al. | 375/240.23 |
| 2002/0164070 A1* | 11/2002 | Kuhner et al. | 382/159 |
| 2003/0194012 A1* | 10/2003 | Sakai et al. | 375/240.23 |
| 2009/0287620 A1* | 11/2009 | Xu | 706/12 |
| 2009/0324060 A1* | 12/2009 | Sato et al. | 382/159 |

* cited by examiner

*Primary Examiner* — Andy Rao
*Assistant Examiner* — Jared Walker
(74) *Attorney, Agent, or Firm* — Christopher P. Maiorana, PC

(57) ABSTRACT

An apparatus comprising a classifier cache, a plurality of variable length decoder circuits and a core engine circuit. The classifier cache may be configured to store one or more compressed classifier streams. The plurality of variable length decoder circuits may each be configured to generate one or more uncompressed classifier streams in response to a respective one of the compressed classifier streams received from the classifier cache. The core engine circuit may be configured to detect one or more objects in a video signal by checking a portion of the video signal using the uncompressed classifier streams.

20 Claims, 6 Drawing Sheets

| LEFT | WIDTH | LENGTH | CODEWORD | LEFT | WIDTH | LENGTH | CODEWORD |
|---|---|---|---|---|---|---|---|
| 0 | 1 | 7 | 0111000 | 1 | 17 | 11 | 10111100110 |
| 0 | 2 | 7 | 1010011 | 1 | 18 | 8 | 00111001 |
| 0 | 3 | 8 | 11011010 | 1 | 19 | 10 | 0011000000 |
| 0 | 4 | 7 | 0010011 | 2 | 1 | 8 | 11110001 |
| 0 | 5 | 8 | 01010000 | 2 | 2 | 7 | 0111111 |
| 0 | 6 | 7 | 0010101 | 2 | 3 | 8 | 10011100 |
| 0 | 7 | 9 | 011101001 | 2 | 4 | 9 | 111011011 |
| 0 | 8 | 9 | 111100000 | 2 | 5 | 9 | 110111000 |
| 0 | 9 | 9 | 001001011 | 2 | 6 | 8 | 10101011 |
| 0 | 10 | 8 | 10000100 | 2 | 7 | 10 | 0111100111 |
| 0 | 11 | 10 | 1100010001 | 2 | 8 | 9 | 110001101 |
| 0 | 12 | 10 | 1100011001 | 2 | 9 | 9 | 011111000 |
| 0 | 13 | 10 | 1100110111 | 2 | 10 | 9 | 000101011 |
| 0 | 14 | 9 | 011101000 | 2 | 11 | 12 | 111100100110 |
| 0 | 15 | 10 | 1110101001 | 2 | 12 | 10 | 111010 1000 |
| 0 | 16 | 10 | 0101001011 | 2 | 13 | 11 | 10000101000 |
| 0 | 17 | 11 | 11110010100 | 2 | 14 | 10 | 0010010001 |
| 0 | 18 | 9 | 100100011 | 2 | 15 | 10 | 1001110101 |
| 0 | 19 | 11 | 11110010101 | 2 | 16 | 10 | 1111000010 |
| 0 | 20 | 8 | 10111111 | 2 | 17 | 10 | 0001010010 |
| 1 | 1 | 7 | 1001001 | 2 | 18 | 9 | 110001111 |
| 1 | 2 | 9 | 111010101 | 3 | 1 | 7 | 0110110 |
| 1 | 3 | 8 | 10100100 | 3 | 2 | 7 | 1011010 |
| 1 | 4 | 9 | 110011110 | 3 | 3 | 7 | 1101100 |
| 1 | 5 | 9 | 000101100 | 3 | 4 | 8 | 01011110 |
| 1 | 6 | 8 | 01000000 | 3 | 5 | 9 | 010000011 |
| 1 | 7 | 11 | 11101011100 | 3 | 6 | 8 | 01111101 |
| 1 | 8 | 10 | 1111001011 | 3 | 7 | 9 | 101001010 |
| 1 | 9 | 10 | 1101101100 | 3 | 8 | 9 | 001100010 |
| 1 | 10 | 10 | 1110011001 | 3 | 9 | 9 | 000101000 |
| 1 | 11 | 13 | 1000010100100 | 3 | 10 | 11 | 111010 11101 |
| 1 | 12 | 10 | 1111100111 | 3 | 11 | 12 | 111100100111 |
| 1 | 13 | 13 | 1000010100101 | 3 | 12 | 9 | 000101101 |
| 1 | 14 | 11 | 11111001100 | 3 | 13 | 10 | 1101101101 |
| 1 | 15 | 10 | 1010111011 | 3 | 14 | 9 | 010100100 |
| 1 | 16 | 10 | 0111100110 | 3 | 15 | 10 | 1001110100 |

FIG. 3a

| LEFT | WIDTH | LENGTH | CODEWORD | LEFT | WIDTH | LENGTH | CODEWORD |
|---|---|---|---|---|---|---|---|
| 3 | 16 | 10 | 1010111010 | 6 | 4 | 7 | 1001100 |
| 3 | 17 | 10 | 0011100001 | 6 | 5 | 8 | 01011111 |
| 4 | 1 | 7 | 1111101 | 6 | 6 | 8 | 11100011 |
| 4 | 2 | 7 | 1110111 | 6 | 7 | 9 | 101010101 |
| 4 | 3 | 7 | 1101000 | 6 | 8 | 8 | 11100111 |
| 4 | 4 | 7 | 0111011 | 6 | 9 | 10 | 1111000011 |
| 4 | 5 | 9 | 101010100 | 6 | 10 | 9 | 011111001 |
| 4 | 6 | 8 | 11001100 | 6 | 11 | 12 | 111100100101 |
| 4 | 7 | 10 | 1011111011 | 6 | 12 | 9 | 101001011 |
| 4 | 8 | 9 | 110 001110 | 6 | 13 | 12 | 100001010011 |
| 4 | 9 | 11 | 11001101101 | 6 | 14 | 9 | 110111100 |
| 4 | 10 | 9 | 101011100 | 7 | 1 | 6 | 100011 |
| 4 | 11 | 10 | 1010111110 | 7 | 2 | 6 | 110010 |
| 4 | 12 | 8 | 01111000 | 7 | 3 | 6 | 000100 |
| 4 | 13 | 10 | 0010010000 | 7 | 4 | 7 | 1000100 |
| 4 | 14 | 10 | 1110101111 | 7 | 5 | 8 | 11111111 |
| 4 | 15 | 11 | 11111001101 | 7 | 6 | 6 | 000010 |
| 4 | 16 | 10 | 1011111010 | 7 | 7 | 9 | 001110001 |
| 5 | 1 | 6 | 011000 | 7 | 8 | 9 | 001100011 |
| 5 | 2 | 6 | 010101 | 7 | 9 | 10 | 1000010101 |
| 5 | 3 | 6 | 011001 | 7 | 10 | 9 | 001100001 |
| 5 | 4 | 7 | 1010110 | 7 | 11 | 11 | 10111100111 |
| 5 | 5 | 8 | 11011101 | 7 | 12 | 10 | 1011110010 |
| 5 | 6 | 7 | 1000101 | 7 | 13 | 10 | 0011100000 |
| 5 | 7 | 9 | 110011010 | 8 | 1 | 6 | 001111 |
| 5 | 8 | 8 | 00010111 | 8 | 2 | 6 | 010001 |
| 5 | 9 | 10 | 0011000001 | 8 | 3 | 6 | 000011 |
| 5 | 10 | 8 | 01010001 | 8 | 4 | 6 | 011010 |
| 5 | 11 | 10 | 1010111111 | 8 | 5 | 9 | 111011010 |
| 5 | 12 | 9 | 100001011 | 8 | 6 | 8 | 11100010 |
| 5 | 13 | 12 | 111100100100 | 8 | 7 | 9 | 001001010 |
| 5 | 14 | 11 | 11001101100 | 8 | 8 | 10 | 1111100100 |
| 5 | 15 | 9 | 010000010 | 8 | 9 | 10 | 1110011000 |
| 6 | 1 | 6 | 100101 | 8 | 10 | 10 | 1100010000 |
| 6 | 2 | 6 | 010011 | 8 | 11 | 11 | 00010100110 |
| 6 | 3 | 6 | 000001 | 8 | 12 | 9 | 111001101 |

FIG. 3b

| LEFT | WIDTH | LENGTH | CODEWORD | LEFT | WIDTH | LENGTH | CODEWORD |
|---|---|---|---|---|---|---|---|
| 9 | 1 | 6 | 101000 | 12 | 7 | 10 | 1100011000 |
| 9 | 2 | 6 | 111101 | 12 | 8 | 8 | 01110101 |
| 9 | 3 | 6 | 001011 | 13 | 1 | 6 | 101100 |
| 9 | 4 | 7 | 0100001 | 13 | 2 | 7 | 1110010 |
| 9 | 5 | 9 | 110111001 | 13 | 3 | 7 | 1111110 |
| 9 | 6 | 8 | 11101100 | 13 | 4 | 9 | 111010110 |
| 9 | 7 | 10 | 1111001000 | 13 | 5 | 9 | 110011111 |
| 9 | 8 | 9 | 000101010 | 13 | 6 | 8 | 10111101 |
| 9 | 9 | 9 | 011110010 | 13 | 7 | 9 | 101111100 |
| 9 | 10 | 10 | 0101001010 | 14 | 1 | 6 | 000111 |
| 9 | 11 | 11 | 00010100111 | 14 | 2 | 7 | 1010100 |
| 10 | 1 | 6 | 100000 | 14 | 3 | 6 | 001101 |
| 10 | 2 | 6 | 000000 | 14 | 4 | 9 | 110111101 |
| 10 | 3 | 7 | 1110000 | 14 | 5 | 9 | 100100010 |
| 10 | 4 | 7 | 0101110 | 14 | 6 | 7 | 1011101 |
| 10 | 5 | 8 | 10011111 | 15 | 1 | 6 | 001000 |
| 10 | 6 | 7 | 0011101 | 15 | 2 | 7 | 1011100 |
| 10 | 7 | 9 | 101111000 | 15 | 3 | 8 | 11111110 |
| 10 | 8 | 9 | 101011110 | 15 | 4 | 8 | 10011110 |
| 10 | 9 | 10 | 1111100101 | 15 | 5 | 9 | 110001011 |
| 10 | 10 | 8 | 01010011 | 16 | 1 | 7 | 1101001 |
| 11 | 1 | 6 | 110101 | 16 | 2 | 7 | 0111001 |
| 11 | 2 | 6 | 010110 | 16 | 3 | 7 | 0010100 |
| 11 | 3 | 7 | 1110100 | 16 | 4 | 7 | 0011001 |
| 11 | 4 | 8 | 11011111 | 17 | 1 | 7 | 1001101 |
| 11 | 5 | 9 | 110110111 | 17 | 2 | 8 | 11110011 |
| 11 | 6 | 8 | 11001110 | 17 | 3 | 7 | 0110111 |
| 11 | 7 | 9 | 001001001 | 18 | 1 | 7 | 1000011 |
| 11 | 8 | 9 | 100111011 | 18 | 2 | 7 | 1011011 |
| 11 | 9 | 9 | 110001010 | 19 | 1 | 8 | 11111000 |
| 12 | 1 | 6 | 110000 | | | | |
| 12 | 2 | 6 | 010010 | | | | |
| 12 | 3 | 6 | 000110 | | | | |
| 12 | 4 | 7 | 0111101 | | | | |
| 12 | 5 | 9 | 110001001 | | | | |
| 12 | 6 | 8 | 10010000 | | | | |

FIG. 3c

METHOD AND/OR APPARATUS FOR OBJECT DETECTION UTILIZING CACHED AND COMPRESSED CLASSIFIER INFORMATION

FIELD OF THE INVENTION

The present invention relates to image processing generally and, more particularly, to a method and/or apparatus for implementing object detection utilizing cached and compressed classifier information.

BACKGROUND OF THE INVENTION

Detecting objects by locating the position and size of objects in digital images is an important technology used in numerous applications. In digital cameras, the ability to detect faces can offer improvement in automatic camera control functions such as exposure, focus, color balance, and flash control. Video cameras can also utilize object detection to control various recording modes and qualities. Object detection also serves as a prerequisite function needed to enable more advanced features, such as smile-triggered shutter control, eye-blink avoidance, and object recognition.

One conventional object detection method is implemented as a binary pattern-classification task. In a binary pattern-classification task, the content of a given part of an image is transformed into features. Afterwards, a classifier trained on example objects determines whether a particular region of the image is an object or a non-object. Objects can be faces or other features. Non-objects can be background patterns. A window-sliding technique is often employed. In a window-sliding technique, a classifier is used to classify portions of an image. The portions of the image are classified at all locations and scales as either objects or non-objects. The portions of the image classified are usually square or rectangular.

A commonly used conventional approach for object detection is based on the Viola-Jones method. The general structure of the Viola-Jones method is composed of a hierarchy of layers. At the lowest hierarchy layer, a window associated with an image area for examination is used to determine whether the image area contains an object or not an object. The resolution of the window is coarse enough to ignore detail that does not relevantly contribute to the decision, yet fine enough to resolve differences in broad object features. Broad object features may include eyes, nose or a mouth for face detection methods in digital images. Over this window, features or measures are computed, and classification is performed using these features as inputs. The classifier output is a binary decision value declaring "Object" or "Not-Object".

The window is scanned spatially to cover all locations of the input image for performing object detection. To be able to perform object detection over a range of possible object sizes, the scanning process is repeated over a range of scale sizes. The scaling may be accomplished using two methods. For the first method, the window size and associated feature computations are scaled through the range of desired scales, using the same intact input image. For the second method, the window size is kept fixed and the original input image is scaled down, forming a series of downsampled images to cover the scale range. The choice to either scale the scanning window or to scale the input images is an implementation choice.

The classifier in the Viola-Jones method is composed of layers of sub-classifiers arranged in a hierarchical tree-like structure. At the lowest level, a weak classifier is formed using one or more Haar features computed in the operating window. Haar features are sums of pixels over rectangular regions.

A particular realization of the Viola-Jones classifier can be described by parameters that define structure and decision processing. The overall-defining parameter set is derived through training for the particular detection task at hand, and serves as the blueprint for executing the detection task. The parameters may include the number of rectangles that make up the Haar feature for each weak classifier, rectangle weights in the summation of the Haar feature, rectangle coordinates in the operating window, or weak classifier decision thresholds and decision output weights.

Classifiers can be described by a set of programmable instructions which are loaded from external memory. Loading classifier instructions from external memory allows classifiers to be tuned, changed, and upgraded.

The bandwidth involved in fetching classifier parameters from an external memory can limit the ability for object detection tasks to perform in a fast and efficient way necessary for certain applications, such as real-time video applications.

It would be desirable to implement a processor used for object detection that operates efficiently for use in real-time video applications.

SUMMARY OF THE INVENTION

The present invention concerns an apparatus comprising a classifier cache, a plurality of variable length decoder circuits and a core engine circuit. The classifier cache may be configured to store one or more compressed classifier streams. The plurality of variable length decoder circuits may each be configured to generate one or more uncompressed classifier streams in response to a respective one of the compressed classifier streams received from the classifier cache. The core engine circuit may be configured to detect one or more objects in a video signal by checking a portion of the video signal using the uncompressed classifier streams.

The objects, features and advantages of the present invention include providing an object detection classifier that may (i) detect objects in digital images using a processor architecture, (ii) employ internal memory cache for storing classifiers, (iii) employ a compressed representation of classifiers, (iv) partition classifier definitions into multiple parallel processing streams, (v) decompress classifiers by implementing one or more variable length decoders and/or (vi) provide a fast and efficient implementation.

BRIEF DESCRIPTION OF THE DRAWINGS

These and other objects, features and advantages of the present invention will be apparent from the following detailed description and the appended claims and drawings in which:

FIGS. 3a-c illustrate an example of Huffman VLC codewords designed for coding rectangle coordinate pairs.

DETAILED DESCRIPTION OF THE PREFERRED EMBODIMENTS

The present invention provides a dedicated processor for implementing object detection in a video system. While the specific architectures described are specifically applicable to the Viola-Jones-based object detection, the present invention may be used for object detection in any system that involves lengthy programmable classifier definitions.

Figure 1:
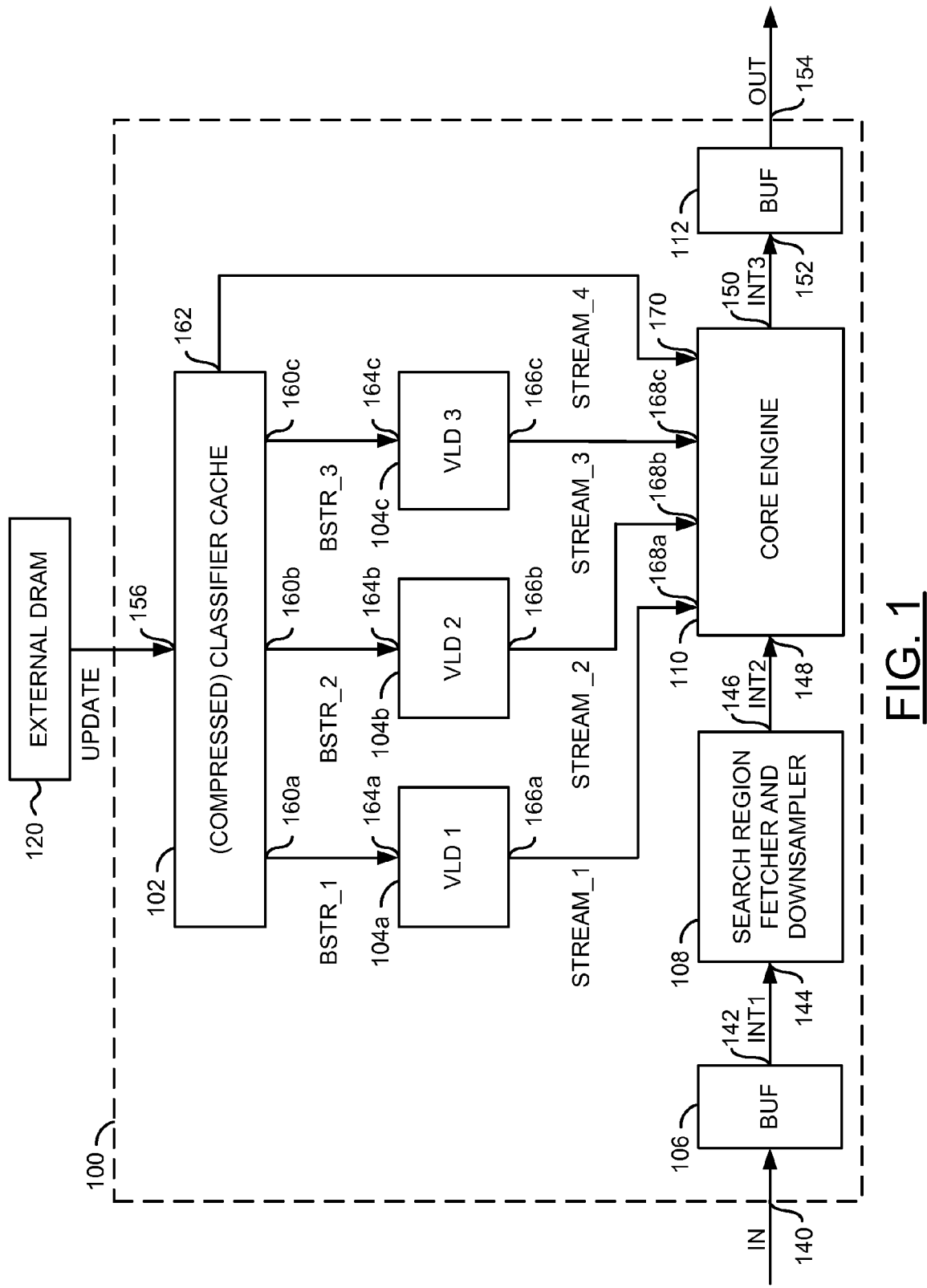
FIG. 1 is a block diagram of an object detection classifier shown in accordance with a preferred embodiment of the present invention.

Referring to FIG. 1, a block diagram 100 of an object detection classifier is shown in accordance with a preferred embodiment of the present invention. The circuit 100 generally comprises a block (or circuit) 102, a plurality of blocks (or circuits) 104a-104c, a block (or circuit) 106, a block (or circuit) 108, a block (or circuit) 110, a block (or circuit) 112 and a block (or circuit) 120. In one example, the circuit 102 may be implemented as a compressed classifier cache circuit. The circuit 102 may be configured to store a plurality of compressed classifier streams. In one example, the circuits 104a-104c may be implemented as variable length decoder (VLD) circuits. In one example, the circuit 106 may be implemented as a buffer circuit. In one example, the circuit 108 may be implemented as a search region fetcher and downsampler circuit. In one example, the circuit 110 may be implemented as a core engine circuit. In one example, the circuit 112 may be implemented as a buffer circuit. In one example, the circuit 120 may be implemented as an external dynamic random access memory (DRAM) circuit.

The circuit 102 may have an input 156 that may receive a signal (e.g., UPDATE), an output 160a that may present a signal (e.g., BSTR_1), an output 160b that may present a signal (e.g., BSTR_2), an output 160c that may present a signal (e.g., BSTR_3) and an output 162 that may present a signal (e.g., STREAM_4). The circuit 104a may have an input 164a that may receive the signal BSTR_1 and an output 166a that may present a signal (e.g., STREAM_1). The circuit 104b may have an input 164b that may receive the signal BSTR_2 and an output 166b that may present a signal (e.g., STREAM_2). The circuit 104c may have an input 164c that may receive the signal BSTR_3 and an output 166c that may present a signal (e.g., STREAM_3). The signals BSTR_1, BSTR_2 and BSTR_3 may be compressed signals that include parameters or a library stored in the classifier cache 102. A particular number of compressed signals may be varied (e.g., either increased or decreased) to meet the design criteria of a particular implementation. The signals STREAM_1, STREAM_2, STREAM_3 and STREAM_4 may be uncompressed signals. The particular number of uncompressed signals may be varied (e.g., either increased or decreased) to meet the design criteria of a particular implementation. The signal UPDATE may be used to provide updates to the information stored in the circuit 102.

The circuit 106 may have an input 140 that may receive a signal (e.g., IN) and an output 142 that may present a signal (e.g., INT1). The circuit 108 may have an input 144 that may receive the signal INT1 and an output 146 that may present a signal (e.g., INT2). The circuit 110 may have an input 148 that may receive the signal. INT2, an input 168a that may receive the signal STREAM_1, an input 168b that may receive the signal STREAM_2, an input 168c that may receive the signal STREAM_3, an input 170 that may receive the signal STREAM_4 and an output 150 that may present a signal (e.g., INT3). The circuit 112 may have an input 152 that may receive the signal INT3 and an output 154 that may present a signal (e.g., OUT). The signal IN may represent an input video signal comprising a series of images. The signal IN may also represent a single input image. The signal OUT may represent detection results. For example, the signal OUT may point to one or more portions of the signal IN that have particular features and/or objects detected by the circuit 110. The circuit 106 may be a buffer circuit configured to provide an input buffer for the signal IN. The circuit 112 may be a buffer circuit configured to provide an output buffer that presents the signal OUT.

The core engine circuit 110 may be configured to receive the signals STREAM_1, STREAM_2, STREAM_3 and STREAM_4. The circuit 110 may identify a search region of the signal INT1 to be searched. The search region may comprise a number of pixels of a frame of the signal INT1. The search region fetcher and downsampler circuit 108 may present the signal INT2 as a reduced resolution signal to the core engine circuit 110. The core engine circuit 110 may evaluate the definition parameters of the signals STREAM_1, STREAM_2, STREAM_3 and STREAM_4 compared with the search region. The core engine circuit 110 may then present the signal INT3 that identifies one or more found objects in the search region.

The classifier operation performed by the circuit 110 may contain nearly all of the descriptors at the weak classifier level. Therefore, the system 100 may be designed to optimize how the parameters or library of the weak classifiers are represented and loaded for evaluation.

An example of an implementation of a weak classifier parameter may be shown by the following structure (or syntax):

```
WEAK_CLASSIFIER {
   NUM_RECTANGLES
   ALPHA (Weak classifier output weights)
   THRESHOLD_WC (Weak classifier decision threshold)
   for r=1 to NUM_RECTANGLES {
   RECTANGLE
   }
}
RECTANGLE
   LEFT (coordinate)
   TOP (coordinate)
   WIDTH (coordinate)
   HEIGHT (coordinate)
   WEIGHT
}
```

The on-board classifier cache memory 102 may store a number of classifier parameters (e.g., output weights, decision threshold, etc.). With such an implementation, the classifier parameters only need to be loaded into the classifier cache memory 102 from the external memory 120 once at the beginning of the search. In general, the classifier cache memory 102 is loaded when the hardware is initialized. The classifier cache memory 102 may be reloaded if additional classifiers are needed as a function of a particular operating mode and/or if there are more total classifiers than fit into the internal classifier cache memory 102. In one example, the external memory 120 may be implemented as a DRAM memory. However, other memories may be implemented to meet the design criteria of a particular implementation. Additionally, updates may be provided through a communication channel, such as a network, a wireless communication channel, etc.

During execution of a search, scanning from one search position to the next, all of the needed classifier parameters are resident and fetched from the local classifier cache circuit 102. Access to the external memory 120 is not needed to retrieve classifier parameters during the scanning process.

Some parameters may be compressed, while other parameters may not be compressed. Parameters from the weak classifier prototype structure that benefit from compression may be partitioned into separate streams apart from parameters which are not compressed. While four streams are shown, the particular number of streams may be varied to meet the design criteria of a particular implementation. In one example, the stream BSTR_1 may be a stream of the rectangle parameters (e.g., left, width). In one example, the stream BSTR_2 may be another stream of the rectangle parameters (e.g., top, height). In one example, the stream BSTR_3 may be a stream of the weak classifier alpha parameters. In one example, the STREAM_4 may be a stream of all the other uncompressed classifier parameters.

The classifier definition may be configured in the classifier cache memory 102 as four separate memory areas corresponding to the four separate streams. Stream pointers may be implemented to locate where each stream resides in the cache memory 102. The streams BSTR_1, BSTR_2, and BSTR_3 may reside in the cache memory 102 in a compressed format. The stream STREAM_4 may reside in the cache memory 102 in an uncompressed format. The particular parameters that are stored in compressed format and the particular parameters that are stored in uncompressed format may be varied to meet the design criteria of a particular implementation.

The classifier streams STREAM_1, STREAM_2, STREAM_3, and/or STREAM_4 may be presented from the classifier cache 102 in parallel. In one example, the classifier cache 102 may be implemented as a multi-port memory to enable a parallel readout. In another example, the classifier cache 102 may be implemented as a time multiplexed single port memory with arbitration. In another example, the classifier cache 102 may be implemented as a plurality of separate memory circuits. The VLD circuits 104a-104c may each correspond to one of the compressed streams BSTR_1, BSTR_2, and BSTR_3. The circuits 104a-104c may decode the compressed parameters from the signals BSTR_1-BSTR_3 received from the classifier cache 102. The circuits 104a-104c may convey the actual uncompressed value of those parameters (i.e., STREAM_1-STREAM_3) to the core engine 110 for evaluation. The parallel readout and parallel VLD mechanisms increase the throughput when fetching classifier instructions compared to the conventional serial approaches.

A typical classifier may be made up of thousands of weak classifiers. Every bit used in representing the prototype structure of the weak classifier parameters has the potential to be magnified one thousand-fold. Therefore, compressing the weak classifier and rectangle parameters may save on cache space. The on-board cache memory 102 may be of sufficient size to save the parameters described, and also optimized to reduce overall processor area and cost. The statistics of various weak classifier and rectangle parameters typically show presence of statistical correlation (redundancy). The probability distributions of those parameters may be modeled by using compression techniques to reduce the entire classifier representation. In one example, compression of up to 40% (or more) may be implemented.

As part of such compression, the system 100 recognizes dependencies in the rectangle parameters. One such dependency is the left coordinate and the width of a rectangle. For example, for a 20×20 pixel search window, rectangles may have a left coordinate ranging from 0 to 19 and a width ranging from 1 to 20. However, not all values of the left coordinate and the width may need to be independently specified.

Figure 2:
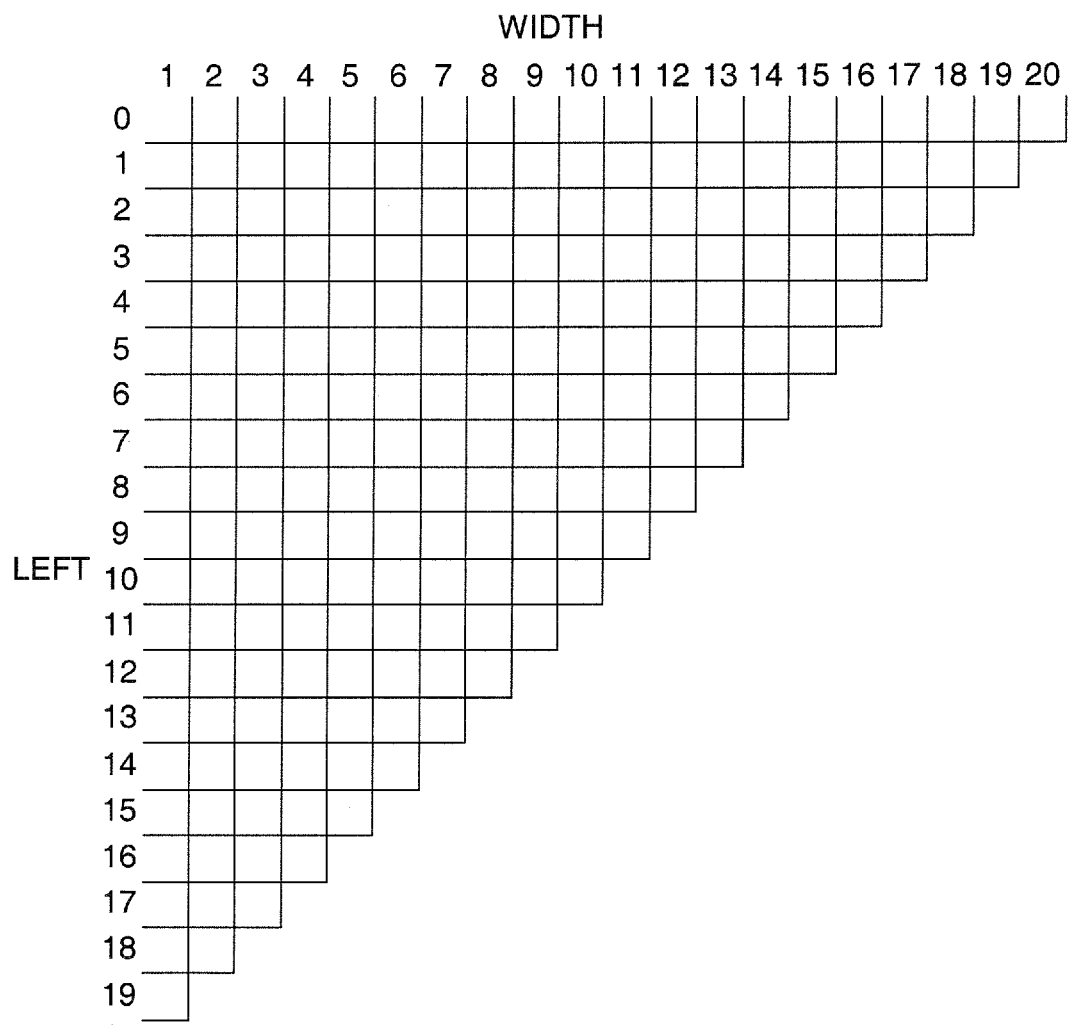
FIG. 2 shows the range space of coordinate pairs for specifying rectangles in a pixel classifier operating window.

Referring to FIG. 2, an example of an allowable range space is shown. The width is shown as being dependent on the left coordinate. Over such a two-dimensional range space, the 2-D probability distribution may be modeled. Huffman variable length codewords may then be designed based on the particular probability model using standard Huffman VLC design techniques.

Referring to FIGS. 3a-c, a table comprising an example of Huffman VLC codewords designed for coding the rectangle coordinate pairs (e.g., left, width) is shown. The rectangle coordinate pairs (e.g., top, height) are similarly related. Therefore, the same Huffman VLC table may be used for compression.

Also, as part of the compression method, the present invention recognizes that the weak classifier alpha parameter tends to have a non-uniform probability distribution. Therefore, the weak classifier alpha parameters may also be Huffman VLC encoded to contribute to classifier cache space savings.

Figure 4:
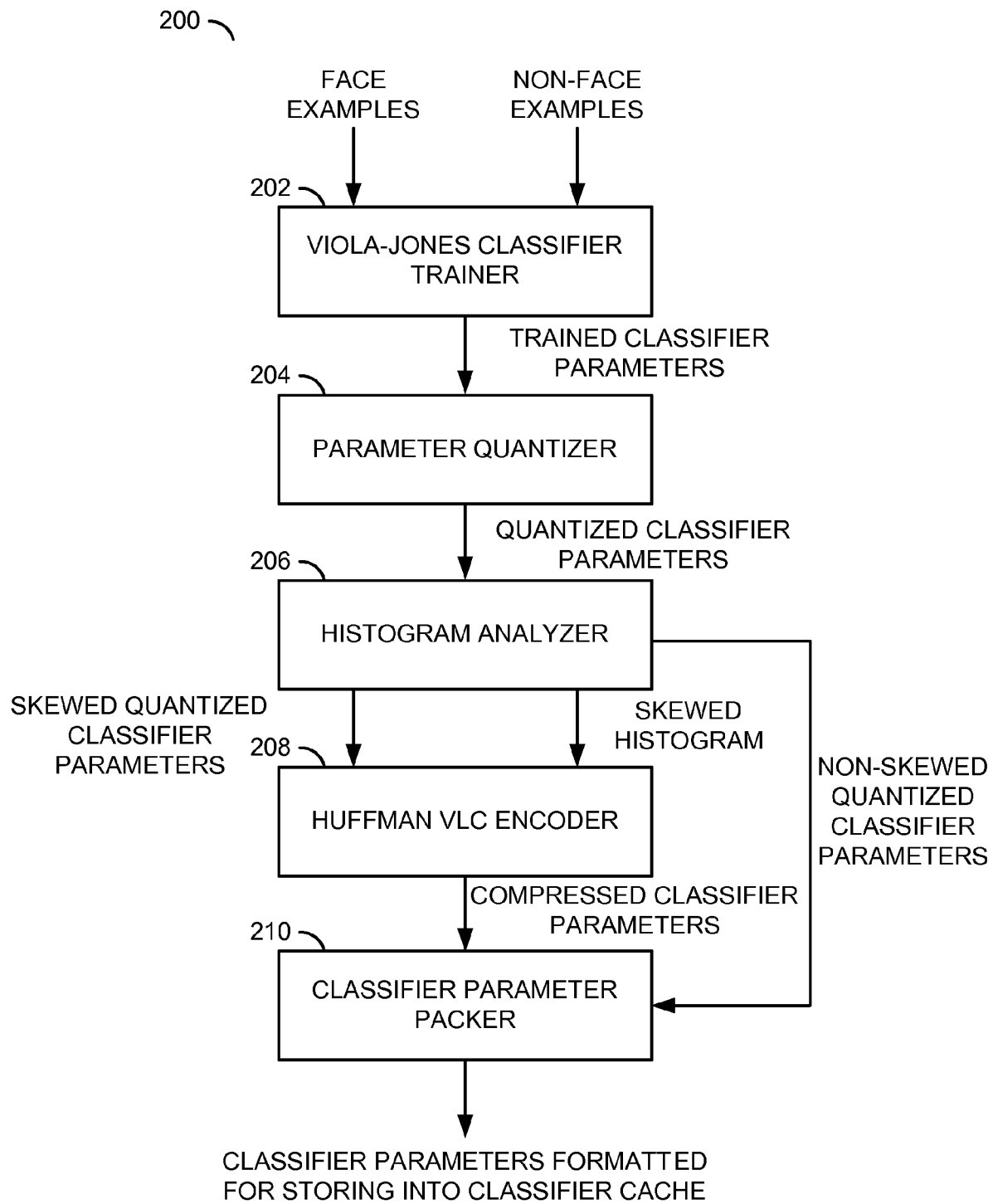
FIG. 4 is a flowchart showing a method for formatting classifier parameters to store into classifier cache.

Referring to FIG. 4, a flowchart of a method (or process) 200 for formatting classifier parameters to store into classifier cache is shown. The method 200 generally comprises a step (or state) 202, a step (or state) 204, a step (or state) 206, a step (or state) 208, a step (or state) 210. The state 202 starts the method 200 by executing a Viola-Jones Classifier Trainer based upon a training set of examples. Face examples and non-face examples may be used to generate the trained classifier parameters. The trained classifier parameters most relevant at the weak classifier level are previously described in connection with the WEAK_CLASSIFIER data structure. Some of the parameters of the WEAK_CLASSIFIER data structure, such as ALPHA and THRESHOLD_WC, may be continuous valued and may need to be quantized to a limited number of precision bits to be represented efficiently. The parameter quantizer state 204 may quantize the classifier parameters to a limited number of precision bits. Other parameters may already be in integer format with a known and suitable range for representation, and need not undergo any quantization.

The histogram analyzer state 206 examines the quantized classifier parameters. For each particular parameter examined in state 206, a histogram may be generated to count the number of occurrences of the particular parameter for each quantized value of the particular parameter. The shape (or distribution) of the histogram may be examined to make a binary decision to determine if a particular parameter needs to be compressed. If the histogram shape is sufficiently skewed, then that parameter will undergo compression through the Huffman VLC encoder state 208. The state 208 receives the quantized classifier parameters which have been deemed to have a skewed distribution, along with the skewed histogram distribution. The state 208 then generates a variable-length encoded bitstream representing the classifier parameters in compressed form. If the histogram shape is relatively uniform, or deemed not to be sufficiently skewed, then the quantized parameter will not undergo compression.

The classifier parameter packer state 210 may be used to bundle together the compressed classifier parameters and the non-compressed classifier parameters into a format that may be directly loaded into the classifier cache 102. In some cases, one particular parameter may exhibit dependency with another parameter. For example, the left parameter and the width parameter (as shown in FIG. 2) are not entirely independent parameters. Only certain combinations of left values and width values may be valid. It is beneficial in such cases of two-variable dependency to jointly compress the two parameters in order to achieve even higher compression efficiency. In such case, the histogram analyzer in step 206 generates and examines two-dimensional histograms. The Huffman VLC encoder in step 208 then operates using the 2-D histogram to generate codewords for the joint (left, width) pair symbols (as shown in connection with FIG. 3).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    a classifier cache configured to store a plurality of compressed classifier streams received from an external memory;
    a plurality of variable length decoder circuits each configured to generate an uncompressed classifier stream in response to a respective one of said compressed classifier streams received from said classifier cache; and
    a core engine circuit configured to (i) receive a video signal, (ii) receive each of said uncompressed classifier streams and (iii) detect one or more objects in said video signal by checking a portion of said video signal using each of said uncompressed classifier streams, wherein said video signal is uncompressed when received.

2. The apparatus according to claim 1, wherein said classifier cache is further configured to generate an additional one or more of said uncompressed classifier streams.

3. The apparatus according to claim 1, wherein said classifier cache stores a library of classifier streams.

4. The apparatus according to claim 1, wherein said classifier cache comprises a memory configured to present said compressed classifier streams.

5. The apparatus according to claim 1, wherein said classifier cache is configured to be updated from said external memory.

6. The apparatus according to claim 1, wherein said classifier cache is configured to be updated from a communication channel.

7. The apparatus according to claim 1, further comprising:
    a downsampler circuit configured to reduce a resolution of said video signal prior to said video signal being received by said core engine circuit.

8. The apparatus according to claim 1, further comprising:
    one or more buffer circuits configured to (i) temporarily store said video signal and/or (ii) temporarily store object detection results.

9. The apparatus according to claim 1, wherein said classifier cache stores a plurality of classifier parameters.

10. The apparatus according to claim 1, wherein said classifier cache generates a plurality of said uncompressed classifier streams in parallel.

11. The apparatus according to claim 1, wherein said core engine circuit receives said uncompressed classifier streams in parallel.

12. The apparatus according to claim 1, wherein one or more of said compressed classifier streams comprises left and width classifier rectangle parameters.

13. The apparatus according to claim 1, wherein one or more of said compressed classifier streams comprises top and height classifier rectangle parameters.

14. The apparatus according to claim 1, wherein one or more of said compressed classifier streams comprises left and width classifier rectangle coordinates and top and height classifier rectangle coordinates in a joint two-dimensional manner.

15. The apparatus according to claim 1, wherein one or more of said compressed classifier streams comprises a weak classifier weighting alpha parameter.

16. The apparatus according to claim 2, wherein one or more of said uncompressed classifier streams comprise a plurality of classifier parameters.

17. An apparatus comprising:
    means for storing a plurality of compressed classifier streams received from an external memory using a classifier cache;
    means for generating a plurality of uncompressed classifier streams each in response to a respective one of said compressed classifier streams received from said classifier cache using a plurality of variable length decoder circuits; and
    means for detecting configured to (i) receive a video signal, (ii) receive each of said uncompressed classifier streams and (iii) detect one or more objects in said video signal by checking a portion of said video signal using each of said uncompressed classifier streams with a core engine circuit, wherein said video signal is uncompressed when received.

18. A method for implementing object detection in a video system comprising the steps of:
    (A) storing in a classifier cache a plurality of compressed classifier streams received from an external memory;
    (B) generating a plurality of uncompressed classifier streams each in response to a respective one of said compressed classifier streams;
    (C) receiving a video signal and each of said uncompressed classifier streams at a circuit, wherein said video signal is uncompressed when received; and
    (D) detecting one or more objects in said video signal by checking a portion of said video signal using each of said uncompressed classifier streams.

19. The method according to claim 18, wherein step (A) is further configured to generate one or more of said uncompressed classifier streams.

20. The method according to claim 18, wherein step (A) generates said compressed classifier streams in response to a library of stored classification values.

* * * * *